United States Patent [19]

Sellers et al.

[11] Patent Number: 5,135,805
[45] Date of Patent: Aug. 4, 1992

[54] METHOD OF MANUFACTURING A WATER-RESISTANT GYPSUM COMPOSITION

[75] Inventors: Dwight G. Sellers, Fort Dodge, Iowa; Franklin A. Altman, Hortense; Turner W. Richards, Conyers, both of Ga.

[73] Assignee: Georgia-Pacific Corporation, Atlanta, Ga.

[21] Appl. No.: 558,808

[22] Filed: Jul. 27, 1990

[51] Int. Cl.⁵ ............... C04B 11/00; C04B 24/00; B32B 31/12; B32B 31/22

[52] U.S. Cl. .................. 428/302; 106/772; 106/775; 106/778; 106/776; 106/781; 156/39; 156/41; 156/43; 156/45; 428/703

[58] Field of Search ............... 156/39, 41, 43, 45; 106/772, 775, 776, 778, 781; 428/703, 302

[56] References Cited

U.S. PATENT DOCUMENTS

| | | | |
|---|---|---|---|
| 1,975,787 | 10/1934 | Hansen | 106/34 |
| 2,198,776 | 4/1940 | King et al. | 154/2 |
| 2,432,963 | 12/1947 | Camp | 106/116 |
| 2,464,759 | 3/1949 | Camp | 117/65 |
| 2,483,806 | 10/1949 | Buckley et al. | 106/96 |
| 2,597,901 | 5/1952 | Riddell et al. | 154/45.9 |
| 2,610,130 | 9/1952 | Riddell et al. | 106/116 |
| 3,333,974 | 8/1967 | Sherr | 106/109 |
| 3,455,710 | 7/1969 | Nitzsche et al. | 106/111 |
| 3,935,021 | 1/1976 | Greve et al. | 106/111 |
| 4,341,560 | 7/1982 | Saito et al. | 106/87 |
| 4,411,701 | 10/1983 | Saito et al. | 106/87 |
| 4,643,771 | 2/1987 | Steinbach et al. | 106/111 |
| 4,975,122 | 12/1990 | Parkinson et al. | |

FOREIGN PATENT DOCUMENTS 1223287 8/1966 Fed. Rep. of Germany.

Primary Examiner—William R. Dixon, Jr.
Assistant Examiner—Michael Marcheschi
Attorney, Agent, or Firm—Synnestvedt & Lechner

[57] ABSTRACT

A method for incorporating siloxane into a water-resistant, gypsum-based article is disclosed, comprising, (A) adding said siloxane to water; (B) mixing said siloxane/water mixture with calcined gypsum to form an aqueous slurry; and (C) allowing said slurry to set to form a set gypsum-based, water-resistant article.

19 Claims, No Drawings

METHOD OF MANUFACTURING A WATER-RESISTANT GYPSUM COMPOSITION

FIELD OF THE INVENTION

This invention relates to an improved method of manufacturing water-resistant gypsum compositions and, more particularly, to improving the water resistance of gypsum products by incorporating a siloxane into the composition from which the products are made.

Gypsum is a naturally occurring mineral which is typically found in old salt-lake beds, volcanic deposits and clay beds. In chemical terms, gypsum is calcium sulfate dihydrate ($CaSO_4 \cdot 2H_2O$). This material is produced also as a by-product in various industrial processes.

When calcium sulfate dihydrate is heated sufficiently, a process called calcining, the water of hydration is driven off and there can be formed either calcium sulfate hemihydrate ($CaSC_4 \cdot \frac{1}{2}H_2O$) or calcium sulfate anhydrite ($CaSO_4$), depending on the temperature and duration of exposure. The term "calcined gypsum," as used herein, refers to both the hemihydrate and anhydrite forms of calcium sulfate.

Calcined gypsum is capable of reacting with water to form calcium sulfate dihydrate, which is a fairly hard and rigid product and which is referred to herein as "set gypsum."

An example of a common gypsum product is gypsum board, which is widely used as a structural building panel. Speaking generally, gypsum board comprises a core made from an aqueous slurry of calcined gypsum which hydrates to form set gypsum. Typically, the board has a lining adhered to both of its faces. Presently, the linings used most commonly are either a paper sheet or a glass fiber mat.

A characteristic of set gypsum is that it has a tendency to absorb water. To illustrate, a gypsum core containing no water-resistant additives can absorb as much as 40 to 50 wt.% water when immersed therein at a temperature of 70° F. for about two hours. In applications where the gypsum product is exposed to water or high humidity, this characteristic is undesirable. The absorption of water by the gypsum tends to reduce the strength of the product, to render the product vulnerable to microbiological growth, and to cause the facings to delaminate.

Gypsum board may be used, for example, on the exterior of buildings where it serves as an underlying surface which is covered with such materials as aluminum or wood siding. This type of gypsum board is commonly referred to as "gypsum sheathing," and is often subjected to significant exposure to water and/or humidity. Gypsum board may be used also in bathrooms as an underlying surface which is covered with plastic or ceramic tile and for this purpose it is often referred to as a "tile-backing board." In applications such as these, it is important that the gypsum board exhibit good water resistance.

This invention relates to an improved method of manufacturing water-resistant gypsum compositions which have incorporated therein a siloxane to impart water resistance to the set gypsum product.

REPORTED DEVELOPMENTS

Many additives have been reported as being effective for imparting water resistance to gypsum products. Examples of some water-resistant additives include: metallic resinates (U.S. Pat. No. 1,975,787); wax or asphalt or mixtures thereof (U.S. Pat. No. 2,198,776); water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride (U.S. Pat. No. 2,483,806); a mixture comprising an alkali metal rosin soap, a water soluble alkaline earth metal salt, and residual fuel oil (U.S. Pat. No. 2,597,901); a mixture comprising residual fuel oil and rosin (U.S. Pat. No. 2,610,130); aromatic isocyanates and diisocyanates (U.S. Pat. No. 3,333,974); asphalt/wax emulsion (U.S. Pat. Nos. 2,432,963 and 2,464,759); a mixture comprising poly(vinyl alcohol) and an asphalt/wax emulsion (U.S. Pat. No. 3,935,021); and alkali metal salts of alkylsiliconates and of phenylsiliconates (U.S. Patent Nos. 4,341,560 and 4,411,701).

In commercial applications, the aforementioned asphalt/wax emulsion has been a popularly used water-resistant additive, although more recently, polymeric silicon-based materials such as siloxanes have been used as substitutes for the asphalt/wax emulsion. In this connection, U.S. Pat. Nos. 3,455,710 and 4,643,771 disclose the use of an organopolysiloxane as the water-resistant additive in a set gypsum product.

Although used commercially, there are, nevertheless, problems associated with the incorporation of asphalt/wax and siloxane in gypsum as water-resistant additives. Because of their hydrophobic nature, a property which is associated with their water-resistant properties, they are insoluble in water. As gypsum products are generally formed from an aqueous slurry of calcined gypsum, it is difficult to disperse adequately such water-resistant additives in the gypsum. The most common solution is to emulsify the hydrophobic additive in water, and to add this to the gypsum slurry. Aforementioned U.S. Pat. No. 3,455,710 is illustrative of this method, wherein siloxane, the water-resistant additive, is added to the composition in the form of an aqueous emulsion. This use of emulsions creates storage problems, however, and the additional water necessitates an adjustment in the water added elsewhere in production.

Aforementioned U.S. Pat. No. 4,643,771 discloses a similar method of adding siloxane to plaster, including gypsum, compositions. This patent is directed to improving the water resistance of gypsum compositions produced from a gypsum slurry to which is added a foam of water and surfactant. By way of background, it is noted that it is known to introduce foam into an aqueous gypsum slurry for the purpose of controlling the density of the set gypsum product which is formed from the slurry. This patent teaches that by adding the siloxane to the foam generator, along with the water and surfactant, the siloxane can be sufficiently dispersed within the foam to result in a water-resistant set product. In practice, however, the inclusion of siloxane in the aqueous foam acts to break down the foam, which would result in unduly high board weights and also what are known as "foam swirls," discrete areas in the foam system which comprise partially or completely degraded foam, that is, portions of the foam have been broken down into simple liquid form. When foam swirls are present, the overall foam system has an uneven consistency and areas of variable density, resulting in blisters in the core of the board. In an effort to overcome this, it is necessary to increase the surfactant concentration and/or increase the air added to the foam generator and/or increase the intensity of foam generation.

The method of the present invention can be used to provide a set gypsum product, particularly suitable as a gypsum board core, that has improved water-resistant properties and other manufacturing advantages.

SUMMARY OF THE INVENTION

In accordance with this invention, there is provided an improved method of incorporating siloxane, as a water-resistant additive, into water-resistant gypsum-based articles, particularly, an article which can be used to excellent advantage as the core of water-resistant gypsum wallboard, comprising (A) adding the siloxane to water (including other optional liquid ingredients such as calcium lignosulfonate); (B) mixing said siloxane/water admixture with calcined gypsum to form an aqueous slurry; and (C) shaping and allowing said slurry to set to form a set gypsum-based, water-resistant article. Preferably, the siloxane is poly(methyl hydrogen siloxane).

With regard to the water to which the siloxane is added, it is contemplated that the method of the present invention will be most advantageously practiced by adding the siloxane to a metered flow of water which is added to the gypsum in order to hydrate, or set, the gypsum. Preferably, metering pumps will be used, both for the water and for the siloxane, and with regard to such pumps, the siloxane can be added either upstream or downstream of the water pump. The choice of where to introduce the siloxane will depend, in large part, on the physical characteristics of the manufacturing system. For example, if the siloxane is introduced downstream of the water pump, the siloxane pump must provide sufficient force to overcome the pressure in the water line created by the water pump. For this reason, it may be expedient, in some cases, to introduce the siloxane upstream of the water pump, which is often referred to as the "suction" side of the pump. Examples of metering pumps include centrifugal pumps.

Several important advantages can be realized by the practice of the present invention. For example, and as mentioned above, the complexity and cost of emulsifying the siloxane in water can be completely avoided, as the siloxane can be used in pure, or neat, form, thereby decreasing costs associated with purchasing, transporting, storing and using the siloxane. Another advantage is that conventional gypsum board production facilities can be adapted to practice the present invention with only minor changes. Yet another advantage is that, for those applications involving the addition of foam to the gypsum slurry, the above-recited problems associated with incorporating the siloxane into the foam are avoided. Furthermore, recent test results indicate that the method of the present invention can decrease the total amount of siloxane which must be added to achieve a particular level of water resistance.

DETAILED DESCRIPTION OF THE INVENTION

The essential ingredients for use in preparing the set gypsum product of the present invention are calcined gypsum, water and siloxane. As described more fully below, the product of the present invention can be made conveniently from an aqueous slurry of the calcined gypsum and other constituents comprising the composition.

The major ingredient of the composition of the present invention is calcined gypsum that is capable of hydrating with water to form set gypsum. Thus, anhydrous calcium sulfate or the hemihydrate of calcium sulfate can be used, including the alpha or beta form thereof. It is believed that the beta form of the hemihydrate will be used more widely in the practice of the present invention. In manufacturing gypsum products, for example, gypsum wallboard, it is common to form a slurry from a measured amount of calcined gypsum as described above and an amount of water somewhat exceeding the amount necessary to hydrate the gypsum. This water added to hydrate the gypsum is sometimes referred to as "gauged" water. As the water in excess of the amount required to hydrate the gypsum must be driven off (e.g., by heating the article in an oven as it sets), it is commercially important to minimize the amount of excess water used. To this end, the method of the present invention, wherein the unemulsified siloxane is added directly to the gauged water, provides a manufacturing advantage over the methods of the prior art in that no additional water is added to the slurry in the form of aqueous siloxane emulsions.

The preferred siloxane for use in the practice of the present invention is an organopolysiloxane, preferably an organo-hydrogen polysiloxane, most preferably a poly(alkyl hydrogen siloxane). Such materials are polymeric compounds having a backbone of alternating silicon and oxygen atoms. Preferred polysiloxanes have the general formula

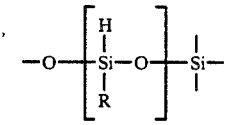

wherein R is a lower alkyl group, most preferably methyl. The use of polysiloxanes to impart water resistance to gypsum articles is well-known, as exemplified by the disclosures of U.S. Pat. No. 3,623,895 and aforementioned U.S. Pat. Nos. 3,455,710 and 4,643,771.

With respect to the proportions of ingredients comprising the composition from which the set product of the present invention is made, for most applications, it is believed that calcined gypsum will comprise at least about 75 wt.% of the composition, with the siloxane being present in a minor, but functional, amount, that is, an amount sufficient to improve the water resistance of the set gypsum article. By introducing the siloxane according to the present invention, water-resistant gypsum articles can be produced using a siloxane concentration no greater than that known in the art, as described earlier.

In fabricating a water-resistant gypsum core in accordance with the present invention, it is recommended that the core be prepared from a composition comprising at least about 80 wt.%, preferably at least about 83 wt.% of calcined gypsum. (Unless stated otherwise, when used herein, the term "wt.%" means weight percent based on the total weight of the dry ingredients used to prepare the set gypsum product.) For any particular application, the amount of the siloxane will best be determined by taking into account various other parameters related to the product. For example, as a general rule, to achieve a particular degree of water resistance, the greater the density of the product, the less siloxane is needed. Taking such factors into account, it is recommended that there be incorporated in the composition from which the set product is made at least about 0.09 wt.% of siloxane. This is roughly equivalent to 1½ lbs of siloxane for each 1000 ft$^2$ of gypsum board, for board weighing about 1950 lbs/1000 ft$^2$. For convenience, this figure will be hereinafter given in parenthesis after the concentration in wt.%, e.g., 0.09 wt.% (1½ lbs/MSF), where MSF is an abbreviation for thousand square feet. The upper amount of siloxane will be governed by economic considerations in that the improvements in water-resistant characteristics tend to level off as additional amounts are used. Also, undue amounts may tend to affect adversely the properties of the set product, for example, as manifested by a reduction in nail holding and flexural strength properties. Taking the aforementioned into consideration, it is believed that satisfactory results can be achieved by the use of an amount of siloxane not in excess of about 0.6 wt.% (10 lbs/MSF). In preferred form, the composition from which the set product is made comprises about 0.18 to about 0.54 wt.% (about 3 to about 9 lbs/MSF) of siloxane.

As will be seen from examples set forth below, the use of the preferred siloxane addition method yields a product with excellent water-resistant characteristics. This is surprising in view of the art-recognized fact that adding unemulsified siloxane directly to the aqueous gypsum slurry does not appreciably improve the water resistant properties of the product.

In addition to the gypsum and water-resistant additive(s) described above, other materials can be included optionally in the core formulation from which the set gypsum product is made in order to impart desired properties thereto and/or facilitate manufacturing, as is known in the art. Examples of such materials include foaming agents, accelerating agents, dispersing agents, viscosity regulators and core adhesives. These materials usually comprise, collectively, about 0.5 to about 2 wt.% as measured against the total weight of the dry ingredients from which the product is formed. These additional materials can be added to the system at various points, depending on manufacturing considerations. For example, calcium lignosulfonate, a dispersing agent, is commonly added to the gauged water used to hydrate the gypsum.

Apart from the inventive method of introducing siloxane into the composition, the gypsum board of the present invention can be produced according to conventional methods. Generally, this initially involves combining the water, gypsum and any other dry ingredients in a mixer to form an aqueous slurry. Optionally, a foam formed from a dilute aqueous solution of a surface active material such as sodium lauryl sulfonate may be added to the slurry in order to control the density of the core Gypsum boards of various types generally have a density within the range of about 42 to about 52 pounds/cubic ft.

The ingredients of the slurry are mixed thoroughly, with the consistency of the slurry being such that the slurry is capable of being dispensed through one or more outlets from the mixer onto a moving facing sheet which is carried on a conveyor belt. Typically, another facing sheet is placed on top of the slurry to sandwich it between two moving facing sheets. Traditionally, the facing sheets are paper, but they may also comprise another material such as, for example, plastic scrim or non-woven or woven fiberglass mat such as described in U.S. Pat. No. 4,647,496, assigned to the same assignee as the present invention.

The thickness of the resultant board is controlled by a forming roll and the edges of the board are formed by appropriate mechanical devices which continuously score, fold and glue the overlapping edges of the facing sheets. Additional guides are used to maintain thickness and width as the setting slurry travels on a moving belt. Desired lengths of board are cut in a continuous operation. Evaporation from the core of excess water which is not involved in the hydration of the calcined gypsum is generally accelerated by heating the board.

The present invention can be used also in making a "faceless" water-resistant gypsum product, that is, one that does not include a facing sheet of paper, glass mat or similar material. Such products contain typically reinforcing fibers, for example, cellulosic fibers such as wood or paper fibers, glass fibers or other mineral fibers and polypropylene or other synthetic resinous fibers. The reinforcing fibers can comprise, for example, about 10 to about 20 wt.% of the dry composition from which the set gypsum product is made. The density of such a product is typically within the range of about 50 to about 80 pounds/cubic ft. As known in the art, such "faceless" gypsum products can be formed from dry or aqueous-based compositions.

EXAMPLES

The examples which follow illustrate the water-resistant properties of set gypsum products produced by the method of the present invention. Comparative examples are included also.

As used herein, the term "water resistance" is a measure of how much water a set gypsum core sample absorbs after it has been immersed in water at a defined temperature for a defined period of time. As described in ASTM standard C-79, a set gypsum core is considered water-resistant if it absorbs 10% or less of its own weight of water when immersed at 70° F. for 2 hours. The dimensions of the core samples are generally about 12" by 12". The core samples, including those tested for comparative purposes, were faced on both sides with paper. Specifically, the paper was a multi-ply chipboard-grade paper manufactured by Georgia-Pacific Corporation and having an average weight of about 48 to about 55 lbs/1000 ft$^2$.

The water resistance of core samples made by the method of the present invention was compared with core samples containing siloxane added according to the conventional method involving adding the siloxane first to a foam of water and surfactant and then adding the resultant admixture to the gypsum slurry. Samples prepared from an aqueous slurry of the constituents were allowed to cure for between 2 and 11 days and were tested for water resistance as described above.

In all of the examples which follow, the source of the polysiloxane was DOW CORNING 1107 FLUID, a gypsum grade poly(methyl hydrogen siloxane).

The gypsum boards of Example 1 and comparative Example 1-C were produced from the same materials in identical concentrations on the same machinery. The only difference is that the siloxane was added to the gauged water, upstream of the gauging pump, in Example 1, while in Example 1-C the siloxane was added to the foam line immediately downstream of the foam generator. The concentration of the dry ingredients was as follows:

| | |
|---|---|
| calcined gypsum | 99.7% |
| accelerator | 0.1% |
| potash | 0.2% |

Additionally, the examples contained the following concentration, based on the total dry ingredients listed above, of the following:

| | |
|---|---|
| siloxane | .48 wt. % (8 lbs/MSF) |
| surfactant | .06 wt. % (1 lb/MSF) |

The average water absorption for the samples produced according to comparative Example 1-C, for ½" board, was 8.8 wt.%. For the samples produced according to Example 1, for ½" board, the average water absorption was 7.4 wt.%, an improvement of about 16%. For ⅝" board, the average water absorption for samples produced according to comparative Example 1-C was 10 wt.%, and for Example 1 was 6.5 wt.%, an improvement of about 35%.

To summarize, siloxane can be used effectively as a water-resistant additive to set gypsum products by adding the siloxane first to a metered flow of water, and then by forming a gypsum slurry by adding the siloxane/water admixture to calcined gypsum and then shaping and allowing the water to hydrate, or set, the gypsum.

We claim:

1. A method for incorporating siloxane while forming a water-resistant, gypsum-based article comprising (A) adding said siloxane to water to form a substantially unemulsified siloxane/water mixture; (B) mixing said siloxane/water mixture with calcined gypsum to form an aqueous slurry comprising at least about 0.18 wt.% siloxane fluid based upon the dry ingredients of the set mixture; and (C) shaping and allowing said slurry to set to form a set gypsum-based, water-resistant article.

2. A method according to claim 1 further comprising adding to said aqueous slurry a foam comprising water and surfactant.

3. A method according to claim 1 wherein said article is a water-resistant set gypsum board.

4. A method according to claim 2 wherein said article is a water-resistant set gypsum board.

5. A method according to claim 4 wherein said siloxane is poly(methyl hydrogen siloxane).

6. A method according to claim 5 wherein said poly(methyl hydrogen siloxane) comprises less than about 0.6 wt.% of the dry ingredients of the set gypsum board.

7. A method according to claim 5 wherein said poly(methyl hydrogen siloxane) comprises about 0.18 to about 0.54 wt.% of the dry ingredients of the set gypsum board.

8. A gypsum-containing board comprising a set mixture including a substantial amount of gypsum dihydrate and prepared with at least about 0.18 wt.% of a substantially unemulsified siloxane fluid added to a gypsum slurry precursor of said set mixture based upon the dry ingredients of the set mixture for imparting to the board a high degree of water resistance such that said board absorbs less than about 10% of its own weight in water when immersed at 70° F. for two hours in accordance with ASTM Standard C-79.

9. The gypsum-containing board of claim 8, wherein said set mixture is sandwiched between two sheets of porous glass fiber mat.

10. The gypsum-containing board of claim 8, wherein said set mixture is sandwiched between two sheets of paper.

11. The gypsum-containing board of claim 8, wherein said set mixture comprises about 3 to about 9 lbs./MSF of a poly(methyl hydrogen siloxane) for about a 0.5 inch board thickness.

12. The gypsum-containing board of claim 8, wherein said siloxane fluid is added to said gypsum through gauged water during the manufacturing of said board.

13. The gypsum-containing board of claim 8, wherein said gypsum dihydrate is derived from at least about 75 wt.% calcined gypsum.

14. The gypsum-containing board of claim 8, wherein said board is faceless.

15. The gypsum-containing board of claim 8, wherein said set mixture comprises cellulosic fibers distributed therethrough.

16. The gypsum-containing board of claim 8, wherein said siloxane fluid consists essentially of unemulsified poly(methyl hydrogen siloxane).

17. A gypsum-containing board comprising a set mixture including a substantial amount of gypsum dihydrate and prepared with a sufficient amount of substantially unemulsified siloxane fluid added to a gypsum slurry precursor of said set mixture to impart to the board a high degree of water resistance such that said board absorbs less than about 10% of its own weight in water when immersed at 70° F. for two hours in accordance with ASTM Standard C-79.

18. A method for incorporating siloxane while forming a water-resistant, gypsum-based article, comprising:
   (a) adding a quantity of siloxane fluid substantially directly into the gauging water used to prepare said gypsum-based article to form a substantially unemulsified siloxane/water mixture;
   (b) mixing said siloxane/water mixture with gypsum hemihydrate to form an aqueous slurry; and
   (c) shaping and allowing said slurry to set to form a set gypsum-based, water-resistant article, said article absorbing less than about 10% of its own weight in water when immersed at 70° F. for two hours in accordance with ASTM Standard C-79.

19. A method for incorporating siloxane during the formation of a water-resistant, gypsum-based article, comprising:
   (a) admixing substantially unemulsified siloxane fluid, gauged water and gypsum hemihydrate to form an aqueous slurry;
   (b) mixing the resulting slurry; and
   (c) shaping and allowing said slurry to set to form a set gypsum-based, water-resistant article, said article absorbing less than about 10% of its own weight in water when immersed at 70° F. for two hours in accordance with ASTM Standard C-79.

* * * * *

UNITED STATES PATENT AND TRADEMARK OFFICE
CERTIFICATE OF CORRECTION

PATENT NO. : 5,135,805

DATED : August 4, 1992

INVENTOR(S) : Sellers et al.

It is certified that error appears in the above-identified patent and that said Letters Patent is hereby corrected as shown below:

ON THE TITLE PAGE:
In the Abstract:

Lines 3-4, please delete the word "siloxane/-water", and insert therefor the word --siloxane/water--.

Column 1, line 21, please delete the chemical formula "($CaSC_4 \cdot \frac{1}{2}H_2O$)", and insert therefor the chemical formula --($CaSO_4 \cdot \frac{1}{2}H_2O$)--.

Column 5, line 56, after the word "core" and before the word "Gypsum", please insert --.--.

Column 7, lines 49-50, please delete the word "poly(-methyl hydrogen siloxane)", and insert therefor the word --poly(methyl hydrogen siloxane)--.

Column 7, lines 52-53, please delete the word "poly(-methyl hydrogen siloxane)", and insert therefor the word --poly(methyl hydrogen siloxane)--.

Column 8, line 26, please delete the word "umemulsified", and insert therefor the word --unemulsified--.

UNITED STATES PATENT AND TRADEMARK OFFICE
CERTIFICATE OF CORRECTION

PATENT NO. : 5,135,805
DATED : August 4, 1992
INVENTOR(S) : Sellers et al.

It is certified that error appears in the above-indentified patent and that said Letters Patent is hereby corrected as shown below:

Column 8, line 31, please delete the word "umemulsified", and insert therefor the word --unemulsified--.

Signed and Sealed this

Thirty-first Day of August, 1993

Attest:

BRUCE LEHMAN

Attesting Officer

Commissioner of Patents and Trademarks